US012510211B2

(12) United States Patent
Shao et al.

(10) Patent No.: US 12,510,211 B2
(45) Date of Patent: Dec. 30, 2025

(54) METHODS, INTERNET OF THINGS SYSTEMS, AND STORAGE MEDIA FOR SAMPLING AND MONITORING SMART GAS PIPELINES

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/086,101

(22) Filed: Mar. 20, 2025

(65) Prior Publication Data
US 2025/0216037 A1    Jul. 3, 2025

(30) Foreign Application Priority Data
Feb. 28, 2025    (CN) .......................... 202510230728.1

(51) Int. Cl.
*F17D 5/00*    (2006.01)
(52) U.S. Cl.
CPC ................... *F17D 5/005* (2013.01)
(58) Field of Classification Search
None
See application file for complete search history.

(56) References Cited

U.S. PATENT DOCUMENTS

| 2008/0204008 A1* | 8/2008 | Paulson | F16L 55/46 324/220 |
| 2015/0300907 A1* | 10/2015 | Giunta | G01H 1/00 702/39 |

(Continued)

FOREIGN PATENT DOCUMENTS

| CN | 101794998 A | 8/2010 |
| CN | 102435399 A | 5/2012 |

(Continued)

OTHER PUBLICATIONS

Liang Wang, Jiafeng Chai, Bei Feng, Nanxi Zhai, Wenyu Yuan, "Research on quantitative evaluation method of gas user regional safety," Proc. SPIE 12259, 2nd International Conference on Applied Mathematics, Modelling, and Intelligent Computing (CAMMIC 2022), 122594F (May 17, 2022) (Year: 2022).*

(Continued)

*Primary Examiner* — Lina Cordero
(74) *Attorney, Agent, or Firm* — METIS IP LLC (57) ABSTRACT

Disclosed are an IoT system, a method, and a storage medium for sampling and monitoring a smart gas pipeline. The method is executed by a government safety monitoring and management platform, and includes: obtaining pipeline sensing data; determining a sampling parameter based on the pipeline sensing data; and in response to obtaining at least one piece of sampling data from at least one sampling device, determining a fault detection command based on the sampling data, and sending the fault detection command to a gas maintenance object platform to schedule a manual inspection. The IoT system includes the government safety monitoring and management platform, a government safety monitoring sensing network platform, a government safety monitoring object platform, a gas company sensing network platform, a gas equipment object platform, and the gas maintenance object platform. The method may be executed (Continued)

by reading computer instructions stored in a non-transitory computer-readable storage medium.

7 Claims, 5 Drawing Sheets

(56) References Cited

U.S. PATENT DOCUMENTS

| | | | |
|---|---|---|---|
| 2018/0017275 A1 | 1/2018 | Merrill | |
| 2018/0094775 A1* | 4/2018 | Jacobson | F17D 5/005 |
| 2020/0103894 A1 | 4/2020 | Cella et al. | |
| 2023/0228608 A1* | 7/2023 | Shao | G01F 25/15 |
| | | | 340/870.02 |
| 2023/0252490 A1* | 8/2023 | Shao | G06Q 50/06 |
| | | | 705/317 |
| 2024/0311846 A1* | 9/2024 | Shao | G06Q 10/06375 |

FOREIGN PATENT DOCUMENTS

| | | | |
|---|---|---|---|
| CN | 103307447 A | 9/2013 | |
| CN | 207521140 U | 6/2018 | |
| CN | 211235160 U | 8/2020 | |
| CN | 112703457 A | 4/2021 | |
| CN | 113820287 A | 12/2021 | |
| CN | 115388342 A * | 11/2022 | F17D 5/02 |
| CN | 116368355 A | 6/2023 | |
| CN | 116415724 A | 7/2023 | |
| CN | 118144927 A | 6/2024 | |
| CN | 118802293 A | 10/2024 | |
| CN | 118937597 A | 11/2024 | |
| CN | 119089275 A | 12/2024 | |
| CN | 119394373 A | 2/2025 | |
| JP | 2013206270 A | 10/2013 | |
| WO | 2021051529 A1 | 3/2021 | |

OTHER PUBLICATIONS

CN115388342A translation (Year: 2022).*
Feng, Jian et al., Development on Leak Detection and Location System for Oil Pipeline, Journal of Northeastern University (Natural Science), 24(8): 731-734, 2003.
First Office Action in Chinese Application No. 202510230728.1 mailed on Apr. 7, 2025, 22 pages.
Notification to Grant Patent Right for Invention in Chinese Application No. 202510230728.1 mailed on Apr. 23, 2025, 4 pages.

* cited by examiner

Obtaining, via a gas company sensing network platform, a gas company management platform, and a government safety monitoring sensing network platform in sequence, pipeline sensing data of at least one pipeline collected and uploaded by a gas equipment object platform.

220

Determining a sampling parameter based on the pipeline sensing data of the at least one pipeline, issuing the sampling parameter to the government safety monitoring object platform, and further issuing the sampling parameter, through the government safety monitoring object platform, to at least one sampling device.

230

In response to obtaining at least one piece of sampling data from the at least one sampling device, determining a fault detection command based on the at least one piece of sampling data, and sending the fault detection command to a gas maintenance object platform, so that the gas maintenance object platform schedules a manual inspection.

METHODS, INTERNET OF THINGS SYSTEMS, AND STORAGE MEDIA FOR SAMPLING AND MONITORING SMART GAS PIPELINES

CROSS-REFERENCE TO RELATED APPLICATIONS

This application claims priority to Chinese Patent Application No. 202510230728.1, filed on Feb. 28, 2025, the entire contents of which are hereby incorporated by reference.

TECHNICAL FIELD

The present disclosure relates to the field of gas regulation, and in particular relates to a method, an Internet of Things (IoT) system, and a storage medium for sampling and monitoring a smart gas pipeline.

BACKGROUND

With the development of society, gas has become an integral part of people's daily life. To ensure the safety of gas use, the strict supervision of a gas pipeline is particularly important. A regulatory process focuses on sampling the gas in the pipeline and analyzing sampling data in depth. However, the current common sampling manner relies on manual operation of a related device. This manner is not only time-consuming and labor-intensive, but may also introduce errors due to human factors, which may affect the accuracy of sampling data and mislead the assessment of an operational status of the pipeline.

Therefore, it is necessary to provide a method, an Internet of Things (IoT) system, and a storage medium for sampling and monitoring a smart gas pipeline to realize dynamic adjustment of a sampling parameter, thereby enabling reasonable sampling of gas within the pipeline. This allows for accurate assessment of the operational status of the pipeline, which is conducive to maintaining the safety and stability of the pipeline and ensuring the security of gas transportation.

SUMMARY

One or more embodiments of the present disclosure provide an Internet of Things (IoT) system for sampling and monitoring a smart gas pipeline. The IoT system includes a government safety monitoring and management platform, a government safety monitoring sensing network platform, a government safety monitoring object platform, a gas company sensing network platform, a gas equipment object platform, and a gas maintenance object platform. The gas equipment object platform includes at least one sampling device and at least one pipeline monitoring device. The gas maintenance object platform includes at least one staff interaction device. The government safety monitoring object platform includes a gas company management platform and a key gas-using enterprise. The government safety monitoring and management platform is configured to obtain, via the gas company sensing network platform, the gas company management platform, and the government safety monitoring sensing network platform in sequence, pipeline sensing data of at least one pipeline collected and uploaded by the gas equipment object platform. The government safety monitoring and management platform is further configured to determine a sampling parameter based on the pipeline sensing data of the at least one pipeline, issue the sampling parameter to the government safety monitoring object platform, and further issue the sampling parameter, through the government safety monitoring object platform, to the at least one sampling device. The government safety monitoring and management platform is further configured to: in response to obtaining at least one piece of sampling data from the at least one sampling device, determine a fault detection command based on the at least one piece of sampling data, and send the fault detection command to the gas maintenance object platform, so that the gas maintenance object platform schedules a manual inspection.

One or more embodiments of the present disclosure provide a method for sampling and monitoring a smart gas pipeline performed based on an IoT system for sampling and monitoring a smart gas pipeline. The method may be executed by a government safety monitoring and management platform of the IoT system. The method includes: obtaining, via a gas company sensing network platform, a gas company management platform, and a government safety monitoring sensing network platform in sequence, pipeline sensing data of at least one pipeline collected and uploaded by a gas equipment object platform; determining a sampling parameter based on the pipeline sensing data of the at least one pipeline, issuing the sampling parameter to a government safety monitoring object platform, and further issuing the sampling parameter, through the government safety monitoring object platform, to the at least one sampling device; and in response to obtaining at least one piece of sampling data from the at least one sampling device, determining a fault detection command based on the at least one piece of sampling data, and sending the fault detection command to a gas maintenance object platform, so that the gas maintenance object platform schedules a manual inspection.

One or more embodiments of the present disclosure provide a non-transitory computer-readable storage medium storing computer instructions. When reading the computer instructions in the storage medium, a computer executes the method for sampling and monitoring a smart gas pipeline described in the present disclosure.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

The accompanying drawings, which are required to be used in the description of the embodiments, are briefly described below. The accompanying drawings do not represent the entirety of the embodiments.

As used herein, "system", "device", "unit" and/or "module" are used as a means of distinguishing between different levels of components, elements, parts, sections or assemblies. The words may be replaced by other expressions if other words would accomplish the same purpose.

As shown in the present disclosure and the claims, unless the context clearly suggests an exception, the words "a", "an", "one", and/or "the" do not refer specifically to the singular, but may also include the plural. Generally, the terms "including" and "comprising" only suggest the inclusion of explicitly identified steps and elements that do not constitute an exclusive list, and the method or devices may also include other steps or elements.

When describing the operations performed in the embodiments of the present disclosure in terms of the steps, the order of the steps are all interchangeable, the steps may be omitted, and other steps may be included in the process of the operation, if not otherwise specified.

Figure 1:
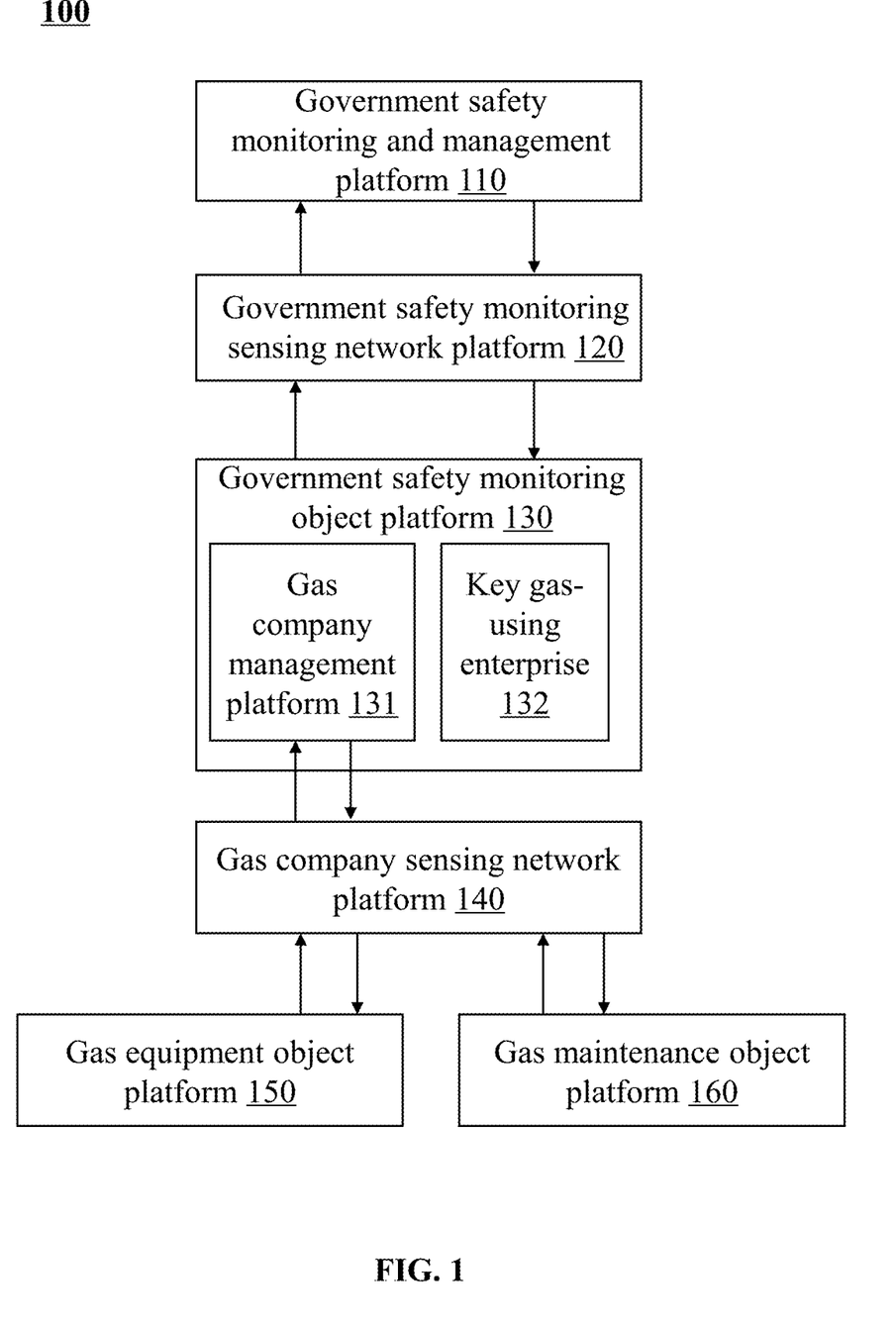
FIG. 1 is a diagram illustrating an exemplary platform structure of an Internet of Things (IoT) system for sampling and monitoring a smart gas pipeline according to some embodiments of the present disclosure.

FIG. 1 is a diagram illustrating an exemplary platform structure of an Internet of Things (IoT) system for sampling and monitoring a smart gas pipeline according to some embodiments of the present disclosure.

In some embodiments, as shown in FIG. 1, an IoT system 100 for sampling and monitoring a smart gas pipeline (hereinafter referred to as the IoT system 100) may include a government safety monitoring and management platform 110, a government safety monitoring sensing network platform 120, a government safety monitoring object platform 130, a gas company sensing network platform 140, a gas equipment object platform 150, and a gas maintenance object platform 160.

The government safety monitoring and management platform 110 refers to a platform for performing monitoring and safety management on a gas pipeline network. The government safety monitoring and management platform 110 may be used to assess various potential failure risks in the gas pipeline network.

In some embodiments, the government safety monitoring and management platform 110 may be configured to: obtain, via the gas company sensing network platform, the gas company management platform, and the government safety monitoring sensing network platform in sequence, pipeline sensing data of at least one pipeline collected and uploaded by the gas equipment object platform; determine a sampling parameter based on the pipeline sensing data of the at least one pipeline, issue the sampling parameter to the government safety monitoring object platform, and further issue the sampling parameter, through the government safety monitoring object platform, to the at least one sampling device; and in response to obtaining at least one piece of sampling data from the at least one sampling device, determine a fault detection command based on the at least one piece of sampling data, and send the fault detection command to the gas maintenance object platform, so that the gas maintenance object platform schedules a manual inspection.

In some embodiments, the government safety monitoring and management platform 110 may be further configured to: determine anomalous sampling data and an anomalous data item in the anomalous sampling data based on the at least one piece of sampling data and standard sampling data; and determine an inspection item based on the anomalous data item, and determine a pipeline sampling location as an inspection pipeline location of a re-inspection pipeline.

In some embodiments, the government safety monitoring and management platform 110 may be further configured to: determine a re-inspection pipeline with a pipeline in-degree greater than a preset degree threshold in the fault detection command as a high-risk pipeline, the preset degree threshold being correlating to the average in-degree of the gas pipeline network; and increase a monitoring frequency of at least one pipeline monitoring device corresponding to the high-risk pipeline in a preset future time period.

In some embodiments, the government safety monitoring and management platform 110 may be further configured to: determine at least one abnormal pipeline and at least one abnormal region corresponding to the at least one abnormal pipeline based on the pipeline sensing data of the at least one pipeline; and determine the sampling parameter based on the at least one abnormal pipeline and the at least one abnormal region corresponding to the at least one abnormal pipeline.

In some embodiments, the government safety monitoring and management platform 110 may be further configured to: for an abnormal pipeline of the at least one abnormal pipeline and an abnormal region corresponding to the abnormal pipeline, determine a sampling detection type based on the abnormal pipeline and the pipeline sensing data of the abnormal region corresponding to the abnormal pipeline; in response to determining that a plurality of sampling devices are provided for the abnormal pipeline, evaluate a sampling detection capability of each of the plurality of sampling devices based on the pipeline sensing data of the abnormal pipeline and the sampling detection type; and determine a to-be-activated sampling device based on the sampling detection capability of at least one sampling device of the plurality of sampling devices.

In some embodiments, the government safety monitoring and management platform 110 may be further configured to determine the sampling detection capability of the at least one sampling device through a detection capability assessment model based on the pipeline sensing data of the abnormal pipeline and the sampling detection type.

In some embodiments, the government safety monitoring and management platform 110 may be further configured to: determine, based on the pipeline sensing data of the at least one pipeline, pipeline sensing data of the at least one pipeline in a future time period; and determine the sampling time based on the pipeline sensing data of the at least one pipeline in the future time period.

In some embodiments, the government safety monitoring and management platform 110 may be further configured to: determine at least one candidate sampling time point; determine at least one sampling stability corresponding to the at least one candidate sampling time point based on the pipeline sensing data of the at least one pipeline in the future time period; and determine the sampling time based on the at least one sampling stability corresponding to the at least one candidate sampling time point.

In some embodiments, the government safety monitoring and management platform 110 may be further configured to: construct a gas pipeline network map, wherein nodes of the gas pipeline network map includes the gas pipeline, a gas supply device, and a gas consuming device, and edges of the gas pipeline network map are connecting edges between the nodes where gas flows mutually; and determine the at least one sampling stability corresponding to the at least one candidate sampling time point through a sampling stability assessment model based on the gas pipeline network map.

In some embodiments, the government safety monitoring and management platform 110 interacts bi-directionally with the government safety monitoring sensing network platform 120. For example, the government safety monitoring and management platform 110 may send the sampling parameter to the government safety monitoring sensing network platform 120 and obtain sampling data associated with the sampling parameter from the government safety monitoring sensing network platform 120.

In some embodiments, the government safety monitoring and management platform 110 may further include a processor. The processor may process at least one of data and information obtained from other platforms. The processor may execute program instructions based on the data, information, and/or processing results to perform one or more of the functions described in the present disclosure. In some embodiments, the processor may include one or more sub-processing devices (e.g., a single-core processing device or a multi-core multi-core processing device). Merely by way of example, the processor may include a central processing unit (CPU), an application-specific integrated circuit (ASIC), etc., or any combination thereof.

The government safety monitoring sensing network platform 120 refers to a functional platform for monitoring and transmitting data related to sampling of gas pipelines. In some embodiments, the government safety monitoring sensing network platform 120 may be configured as a communication base station, a router, a wireless device, etc., and operate based on a communication network.

In some embodiments, the government safety monitoring sensing network platform 120 interacts bi-directionally downwardly with the government safety monitoring object platform 130. For example, the government safety monitoring sensing network platform 120 may send the sampling parameter to the government safety monitoring object platform 130.

The government safety monitoring object platform 130 refers to an object platform for generating sensing information and executing controlling information. In some embodiments, the government safety monitoring object platform 130 may be configured to store the pipeline sensing data and the sampling data in the gas pipeline network and the sampling parameter issued by the government safety monitoring and management platform 110.

In some embodiments, the government safety monitoring object platform 130 may include a gas company management platform 131 and a key gas-using enterprise 132.

The gas company management platform 131 refers to a comprehensive platform for managing information related to gas companies, which may be used to manage parameters related to pipeline sampling of the gas companies.

The key gas-using enterprise 132 refers to a relevant enterprise that requires special attention regarding its gas usage, for example, a chemical plant that consumes a large amount of gas.

In some embodiments, the gas company management platform 131 interacts bi-directionally with the gas company sensing network platform 140.

The gas company sensing network platform 140 refers to a comprehensive management platform for sensing information of a gas company. In some embodiments, the gas company sensing network platform 140 may be configured as a communication network, a gateway, etc.

In some embodiments, the gas company sensing network platform 140 interacts bi-directionally upwardly with the gas company management platform 131 and bi-directionally downwardly with the gas equipment object platform 150 and the gas maintenance object platform 160. For example, the gas company sensing network platform 140 may obtain the pipeline sensing data of the at least one pipeline from the gas equipment object platform 150. As another example, the gas company sensing network platform 140 may send the fault detection command to the gas maintenance object platform 160.

The gas equipment object platform 150 refers to a functional platform for performing pipeline monitoring and sampling. In some embodiments, the gas equipment object platform 150 may include the at least one sampling device and at least one pipeline monitoring device.

The sampling device refers to a device that samples and examines gas in gas pipelines, and may be configured to obtain the sampling data. For example, the sampling device may integrate a temperature sensor, a flow rate detector, a pressure sensor, a concentration detector, a gas analyzer, etc.

In some embodiments, the sampling device may be deployed within a preset pipeline. A deployment location of the sampling device may be obtained from a positioning sensor mounted on the sampling device, or directly from a positioning record at a time of deployment and installation (e.g., a reserved point record during the deployment of the gas pipeline network).

In some embodiments, a plurality of sampling devices may be deployed on the gas pipeline network, and one or more sampling devices may be deployed on a pipeline. The sampling devices may probe conditions of the pipelines within a sampling range.

The pipeline monitoring device refers to a device that monitors gas in gas pipelines and may be configured to obtain the pipeline sensing data. For example, the pipeline monitoring device may integrate a temperature sensor, a flow rate detector, a pressure sensor, etc. The deployment of the pipeline monitoring device is similar to the deployment of the sampling device, which is not repeated here.

The gas maintenance object platform 160 refers to a platform associated with gas maintenance. In some embodiments, the gas maintenance object platform 160 includes at least one staff interaction device.

The staff interaction device refers to a device that enables interaction with staff. For example, the staff interaction device includes a cell phone, a computer, or the like. The staff refers to persons engaged in work related to the gas pipeline network, for example, a safety officer, a maintenance worker, a storage and transportation worker, etc. In some embodiments, the staff interaction device may obtain the fault detection command via the gas maintenance object platform 160 and schedule a manual inspection.

More details regarding the above related parameters (e.g., the sampling data, the pipeline sensing data, the fault detection commands, etc.) may be found in other contents of the present disclosure (e.g., descriptions in connection with FIGS. 2-5).

In some embodiments of the present disclosure, based on the IoT system 100, a closed loop of information operation among the functional platforms can be formed. The IoT system 100 can run coordinately and regularly under a unified management of the government safety monitoring and management platform, realizing smart and information-based sampling of the smart gas pipeline.

Figure 2:
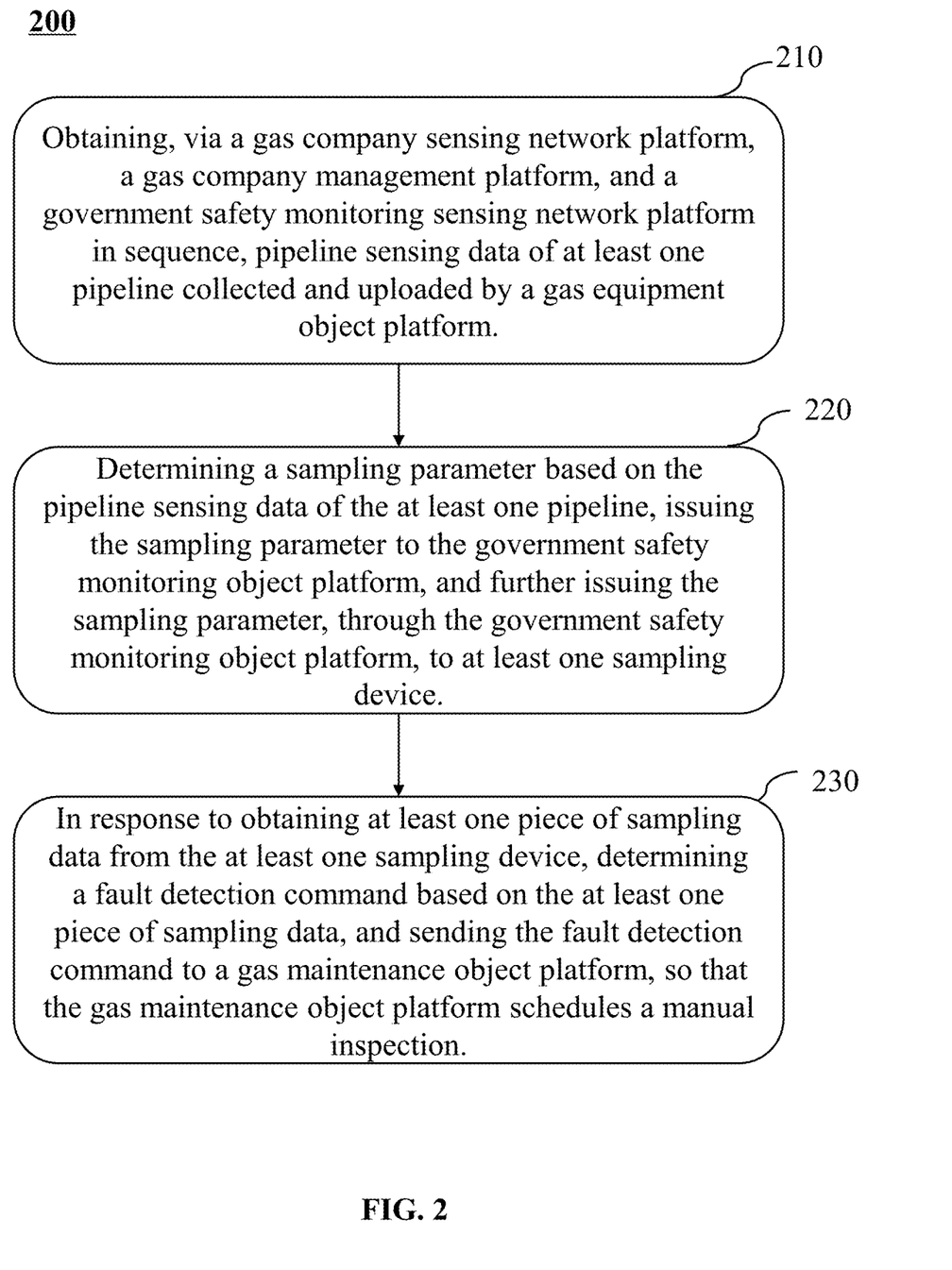
FIG. 2 is a flowchart illustrating an exemplary process of a method for sampling and monitoring a smart gas pipeline according to some embodiments of the present disclosure.

FIG. 2 is a flowchart illustrating an exemplary process of a method for sampling and monitoring a smart gas pipeline according to some embodiments of the present disclosure. As shown in FIG. 2, process 200 includes operation 210-operation 230 as follows.

In some embodiments, the method for sampling and monitoring a smart gas pipeline may be implemented based on the IoT system 100, and executed by the government safety monitoring and management platform 110. For example, process 200 is executed by a processor of the government safety monitoring and management platform 110.

In 210, obtaining, via a gas company sensing network platform, a gas company management platform, and a government safety monitoring sensing network platform in sequence, pipeline sensing data of at least one pipeline collected and uploaded by a gas equipment object platform.

The pipeline sensing data refers to sensing data related to pipelines. The pipelines refer to gas pipelines.

In some embodiments, the pipeline sensing data may include a pipeline temperature, a pipeline air pressure, and a pipeline gas flow rate.

The pipeline temperature, the pipeline air pressure, and the pipeline gas flow rate refer to the temperature, air pressure, and gas flow rate inside the pipeline, respectively.

In some embodiments, the processor may obtain the pipeline sensing data from at least one pipeline monitoring device of the gas equipment object platform via the gas company sensing network platform.

In some embodiments, one or more pipeline monitoring devices may be deployed in a pipeline. When a plurality of pipeline monitoring devices are deployed in a pipeline, the pipeline sensing data of the pipeline may be a sequence composed of a plurality of pieces of pipeline sensing data obtained through monitoring by the plurality of pipeline monitoring devices.

In 220, determining a sampling parameter based on the pipeline sensing data of the at least one pipeline, issuing the sampling parameter to the government safety monitoring object platform, and further issuing the sampling parameter, through the government safety monitoring object platform, to the at least one sampling device.

The sampling parameter refers to a parameter related to an operational situation of the at least one sampling device. In some embodiments, the sampling parameter may include at least one to-be-activated sampling device and at least one pipeline sampling location corresponding to the at least one to-be-activated sampling device.

A to-be-activated sampling device refers to a sampling device that needs to be activated (i.e., ready for a sampling operation).

The pipeline sampling location corresponding to a to-be-activated sampling device refers to a location in the pipeline where the to-be-activated sampling device is activated for sampling, for example, a deployment location of the to-be-activated sampling device.

In some embodiments, the processor may determine the sampling parameter based on the pipeline sensing data of the at least one pipeline in a plurality of ways. For example, the processor may determine a data fluctuation value corresponding to each type of pipeline sensing data for multiple pipelines, and determine the sampling parameter based on data fluctuation values. Merely by way of example, the data fluctuation values include a temperature fluctuation value for pipeline temperatures of the plurality of pipelines, an air pressure fluctuation value for pipeline air pressures of the plurality of pipelines, and a gas flow rate fluctuation value for pipeline gas flow rates of the plurality of pipelines.

The data fluctuation value refers to a numerical value reflecting fluctuation of the pipeline sensing data. In some embodiments, the data fluctuation value may be represented by a range or a variance. For example, the temperature fluctuation values may be represented by the variance of the pipeline temperatures of all pipelines in a gas pipeline network.

Exemplarily, if the data fluctuation value corresponding to each type of the pipeline sensing data is not greater than a preset fluctuation threshold, the processor may determine sampling may not be performed, i.e., the sampling parameter may be determined to be 0 or null. If one or more data fluctuation values corresponding to one or more types of the pipeline sensing data are greater than the preset fluctuation threshold, then the processor may determine to turn on the sampling device in a default pipeline to perform sampling, i.e., the sampling device in the default pipeline is determined as the to-be-activated sampling device, and the deployment location of the sampling device is determined.

The default pipeline refers to an important pipeline in a gas pipeline network. The preset fluctuation threshold refers to a minimum data fluctuation value of the pipeline sensing data that is set in advance. The default pipeline and the preset fluctuation threshold may be set by system default or determined by a technician based on experience and historical data evaluation.

In some embodiments, the processor may further determine at least one abnormal pipeline and at least one abnormal region corresponding to the at least one abnormal pipeline based on the pipeline sensing data of the at least one pipeline; and determine the sampling parameter based on the at least one abnormal pipeline and the at least one abnormal region corresponding to the at least one abnormal pipeline. More details regarding this section may be found in other contents of the present disclosure (e.g., description in connection with FIG. 3).

In some embodiments, the sampling parameter further includes a sampling time, and the processor may further determine, based on the pipeline sensing data of the at least one pipeline, pipeline sensing data of the at least one pipeline in a future time period; and determine the sampling time based on the pipeline sensing data of the at least one pipeline in the future time period. More details regarding this section may be found in other contents of the present disclosure (e.g., description in connection with FIG. 5).

In 230, in response to obtaining at least one piece of sampling data from the at least one sampling device, determining a fault detection command based on the at least one piece of sampling data, and sending the fault detection command to the gas maintenance object platform, so that the gas maintenance object platform schedules a manual inspection.

The sampling data refers to gas-related data obtained by the sampling device. For example, the sampling data includes at least one of a gas flow rate, a gas temperature, a gas pressure, a gas fuel concentration, and a gas fuel composition.

The gas flow rate, the gas temperature, and the gas pressure in the sampling data may correspond to the pipeline gas flow rate, the pipeline temperature, and the pipeline air pressure in the pipeline sensing data, respectively. The corresponding items have the same meaning, but due to differences between the sampling device and the pipeline monitoring device (e.g., the sampling device continues to work normally by default, and the pipeline monitoring device may malfunction, etc.), the corresponding items may have different values.

The gas fuel concentration refers to a concentration of fuel gas inside the pipeline, for example, 5%, etc.

The gas fuel composition refers to fuel components in the gas in the pipeline. For example, the gas fuel composition in a pipeline that transports natural gas primarily includes methane, etc.

In some embodiments, the processor may obtain the sampling data through the sampling device.

The fault detection command refers to a command for directing staff to perform a fault inspection. In some embodiments, the fault detection command may include at least one re-inspection pipeline, and at least one inspection pipeline location, an inspection item, etc., of the at least one re-inspection pipeline.

The re-inspection pipeline refers to a pipeline that needs to be inspected again. The inspection pipeline location refers to a location where the re-inspection pipeline is inspected. For example, the inspection pipeline location may be the pipeline sampling location of the re-inspection pipeline.

The inspection item refers to an item that needs to be inspected, for example, pipeline scaling, etc.

In some embodiments, the processor may determine the fault detection command based on the at least one piece of sampling data in a plurality of ways. For example, based on current sampling data, the processor may search in historical data to identify historical sampling data that has a relatively high first data similarity with the current sampling data, and determine a fault detection command corresponding to the historical sampling data as a current fault detection command. The first data similarity may be represented by a vector distance.

In some embodiments, the processor may determine anomalous sampling data and an anomalous data item in the anomalous sampling data based on the at least one piece of sampling data and standard sampling data, determine the inspection item based on the anomalous data item, and determine the pipeline sampling location as the inspection pipeline location of the re-inspection pipeline.

The standard sampling data refers to sampling data under normal conditions. For example, the standard sampling data may include a standard gas flow rate, a standard gas temperature, a standard gas pressure, a standard gas fuel concentration, a standard gas fuel composition, or the like.

In some embodiments, the standard sampling data may be set by system default or by a technician based on historical data. For example, the processor or the technician may select a historical sampling parameter that has a relatively high similarity to a current sampling parameter, and determine a historical gas flow rate with a highest occurrence frequency in the historical sampling data corresponding to the historical sampling parameter as the standard gas flow rate.

The anomalous sampling data may be sampling data whose similarity to the standard sampling data is lower than a preset similarity threshold.

In some embodiments, the processor may determine a similarity of each of at least one piece of sampling data to the standard sampling data, and designate sampling data with a similarity to the standard sampling data lower than the preset similarity threshold as the anomalous sampling data. The similarity may be represented by a vector distance, or the like. The preset similarity threshold may be a preset distance threshold. For example, if a vector distance between a piece of sampling data and the standard sampling data is lower than the preset distance threshold, the sampling data is the anomalous sampling data.

In some embodiments, the preset similarity threshold may be related to an average in-degree of the gas pipeline network. For example, the greater the average in-degree of the gas pipeline network is, the greater the preset similarity threshold may be.

The average in-degree of the gas pipeline network refers to an average of pipeline in-degrees of pipelines in the gas pipeline network, for example, 3, etc.

The pipeline in-degree for a current pipeline refers to a count of other pipelines from which gas converges into the current pipeline.

The anomalous data item refers to a data item in the anomalous sampling data that is anomalous.

In some embodiments, the processor may determine a first difference between each data item in the anomalous sampling data and a corresponding data item in the standard sampling data, and determine a data item for which the first difference is greater than a first difference threshold as the anomalous data item.

In some embodiments, the first difference may include a gas flow rate difference, a gas temperature difference, a gas pressure difference, a gas concentration difference, and a gas composition difference. The first difference threshold may include a gas flow rate difference threshold, a gas temperature difference threshold, a gas pressure difference threshold, a gas concentration difference threshold, and a gas composition difference threshold.

The gas flow rate difference refers to an absolute value of a difference between the gas flow rate in the anomalous sampling data and the standard gas flow rate in the standard sampling data. Similarly, the gas temperature difference refers to an absolute value of a difference between the gas temperature in the anomalous sampling data and the standard gas temperature in the standard sampling data. The gas pressure difference refers to an absolute value of a difference between the gas pressure in the anomalous sampling data and the standard gas pressure in the standard sampling data. The gas concentration difference refers to an absolute value of a difference between the gas fuel concentration in the anomalous sampling data and the standard gas fuel concentration in the standard sampling data. The gas composition difference refers to an absolute value of a difference between a count of component types of the gas fuel composition in the anomalous sampling data and a count of component types of the standard gas fuel composition in the standard sampling data.

The gas flow rate difference threshold refers to a maximum value of the gas flow rate difference under normal conditions. The same applies to the gas temperature difference threshold, the gas pressure difference threshold, the gas concentration difference threshold, and the gas composition difference threshold.

In some embodiments, the processor may determine the inspection item by querying a first preset relationship table based on the anomalous data item. The first preset relationship table includes a corresponding relationship between anomalous data items and inspection items corresponding to the anomalous data items. The first preset relationship table may be constructed based on historical data. For example, for a historical anomalous data item in the historical data, the processor may statistically analyze one or more historical inspection items corresponding to the historical anomalous data item that are actually performed subsequently, and determine a historical inspection item with a highest occurrence frequency as the historical inspection item corresponding to the historical anomalous data item. The processor may traverse a plurality of historical anomalous data items to construct the first preset relationship table.

In some embodiments, the processor may determine a to-be-activated sampling device corresponding to the anomalous sampling data, and determine the pipeline sampling location corresponding to the to-be-activated sampling device as the inspection pipeline location of the re-inspection pipeline.

In some embodiments of the present disclosure, by determining the similarity between the sampling data and the standard sampling data, the anomalous sampling data and the anomalous data item can be accurately determined. In addition, the preset similarity threshold can be flexibly adjusted based on the average in-degree of the gas pipeline network to identify subtle differences, which improves the reliability of the identified re-inspection pipeline.

In some embodiments, the processor may determine a re-inspection pipeline with a pipeline in-degree greater than a preset degree threshold in the fault detection command as a high-risk pipeline, and increase a monitoring frequency of at least one pipeline monitoring device corresponding to the high-risk pipeline in a preset future time period.

The preset degree threshold refers to a preset maximum value of the pipeline in-degree, for example, 8, etc.

In some embodiments, the preset degree threshold may be correlated to the average in-degree of the gas pipeline network. For example, the preset degree threshold may be equal to the average in-degree of the gas pipeline network. As another example, the preset degree threshold may be positively correlated to the average in-degree of the gas pipeline network.

The high-risk pipeline refers to a pipeline that has a relatively high risk of pipeline failures. The pipeline failures may include a pipeline gas leak, a pipeline blockage, or the like.

In some embodiments, the preset future time period may be a fixed future time period set by default by the processor or preset manually, for example, the next 6 hours after a current moment. In some embodiments, the preset future time period may also be a time period from the current moment until the pipeline failures are resolved.

The monitoring frequency of a pipeline monitoring device refers to a frequency at which the pipeline monitoring device monitors the pipeline to obtain the pipeline sensing data, for example, 30 times per minute, etc.

In some embodiments, after determining the high-risk pipeline, the processor may increase the monitoring frequency of the at least one pipeline monitoring device corresponding to the high-risk pipeline in the preset future time period based on a preset increase amount. The preset increase amount may be a fixed increase amount set by default by the processor or preset manually, for example, 5 times per minute. The preset increase amount may also be a dynamic increase amount determined by the processor based on an average of the pipeline in-degrees of high-risk pipelines. For example, the preset increase amount may be positively correlated to the average value of the pipeline in-degrees of the high-risk pipelines.

In some embodiments of the present disclosure, by determining whether the pipeline in-degree of a re-inspection pipeline is greater than the preset degree threshold, whether the re-inspection pipeline is a high-risk pipeline can be efficiently determined. Furthermore, by increasing the monitoring frequency of the at least one pipeline monitoring device corresponding to the high-risk pipeline, the pipeline failures in the high-risk pipeline can be identified in a timely manner.

In some embodiments of the present disclosure, based on the pipeline sensing data, the sampling parameter can be reasonably determined so that the sampling device can accurately sample to obtain effective sampling data. By analyzing the sampling data to determine the fault detection command, it is conducive to accurately assessing a fault condition of the pipeline, indicating a direction for subsequent troubleshooting, and thus ensuring effective maintenance of the safety and stability of the pipeline.

It should be noted that the foregoing descriptions of process 200 are intended to be exemplary and illustrative only and do not limit the scope of application of the present disclosure. For a person skilled in the art, various corrections and changes can be made to the process 200 under the guidance of the present disclosure. However, these corrections and changes remain within the scope of the present disclosure.

Figure 3:
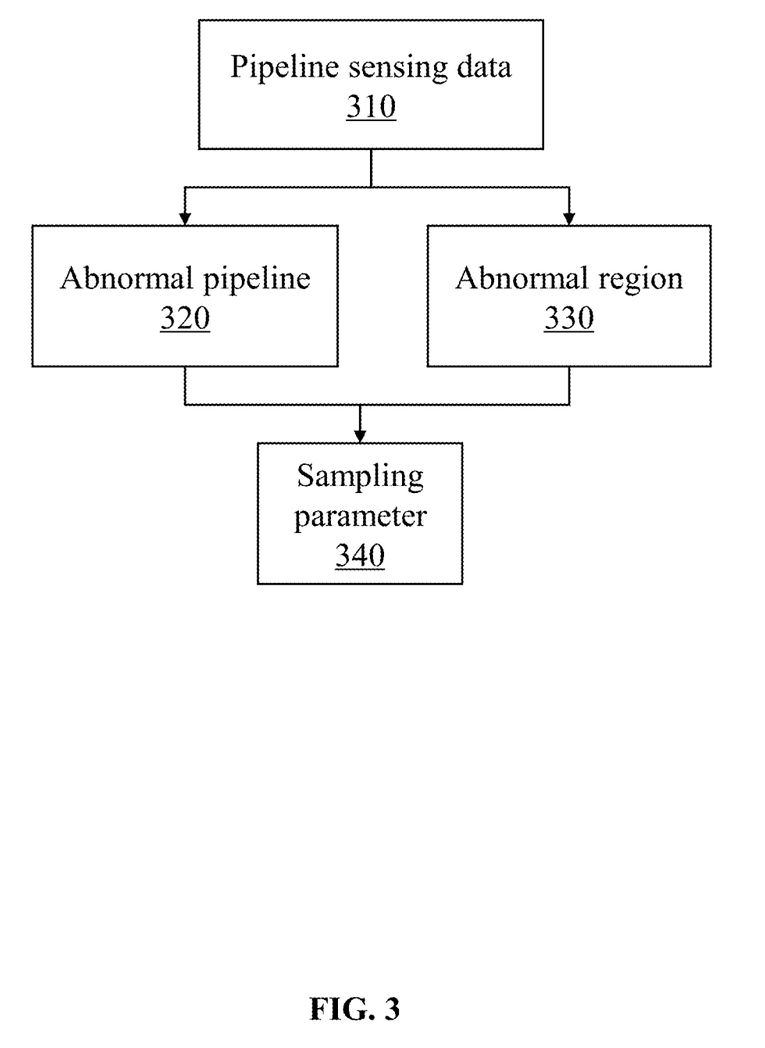
FIG. 3 is a schematic diagram illustrating the determination of a sampling parameter according to some embodiments of the present disclosure.

FIG. 3 is a schematic diagram illustrating an exemplary process for determining a sampling parameter according to some embodiments of the present disclosure.

In some embodiments, as shown in FIG. 3, a processor may determine at least one abnormal pipeline 320 and at least one abnormal region 330 corresponding to the at least one abnormal pipeline 320 based on pipeline sensing data 310 of at least one pipeline; and determine a sampling parameter 340 based on the at least one abnormal pipeline 320 and the at least one abnormal region 330 corresponding to the at least one abnormal pipeline 320.

An abnormal pipeline refers to a pipeline whose corresponding pipeline sensing data is anomalous. An abnormal region refers to a region on the pipeline that has an anomaly.

In some embodiments, the processor may determine a second difference between each data item in the pipeline sensing data of a pipeline and a corresponding data item in standard pipeline sensing data. In response to a determination that the second difference of a data item is greater than a second difference threshold, the processor may determine the data item as an anomalous data item of the pipeline, and determine the pipeline as an abnormal pipeline.

In some embodiments, the second difference may include a pipeline temperature difference, a pipeline air pressure difference, and a pipeline gas flow rate difference. The second difference threshold may include a pipeline temperature difference threshold, a pipeline air pressure difference threshold, and a pipeline gas flow rate difference threshold.

The pipeline temperature difference refers to an absolute value of a difference between a pipeline temperature in the pipeline sensing data and a standard pipeline temperature in the standard pipeline sensing data. The pipeline air pressure difference refers to an absolute value of a difference between a pipeline air pressure in the pipeline sensing data and a standard pipeline air pressure in the standard pipeline sensing data. The pipeline gas flow rate difference refers to an absolute value of a difference between a gas flow rate in the pipeline sensing data and a standard gas flow rate in the standard pipeline sensing data.

The pipeline temperature difference threshold refers to a maximum value of the pipeline temperature difference under normal conditions. The pipeline air pressure difference threshold refers to a maximum value of the pipeline air pressure difference under normal conditions. The pipeline gas flow rate difference threshold refers to a maximum value of the pipeline gas flow rate difference under normal conditions.

The standard pipeline sensing data refers to pipeline sensing data under normal conditions. For example, the standard pipeline sensing data may include the standard pipeline temperature, the standard pipeline air pressure, the standard pipeline gas flow rate, or the like. In some embodiments, the standard pipeline sensing data may be set by system default or determined by a technician based on historical data. For example, the technician may determine historical pipeline sensing data with a highest occurrence frequency in the historical pipeline sensing data of a same pipeline in the historical data as the standard pipeline sensing data.

In some embodiments, the processor may determine the at least one abnormal region based on the at least one abnormal pipeline by querying a second preset relationship table. The second preset relationship table includes a corresponding relationship between abnormal pipelines and abnormal regions corresponding to the abnormal pipelines. The second preset relationship table may be constructed based on historical data. For example, for a historical abnormal pipeline in the historical data, the processor may statistically analyze one or more historical abnormal regions corresponding the historical abnormal pipeline, and determine a historical abnormal region with a highest occurrence frequency as a historical abnormal region corresponding to the historical abnormal pipeline. The processor may traverse a plurality of historical abnormal pipelines to construct the second preset relationship table.

In some embodiments, the processor may determine the sampling parameter based on the at least one abnormal pipeline and the at least one abnormal region corresponding to the at least one abnormal pipeline in a plurality of ways. For example, for each of the at least one abnormal region corresponding to one of the at least one abnormal pipeline, the processor may determine a central position of the abnormal region corresponding to the abnormal pipeline as a pipeline sampling location, and determine a sampling device in a preset range corresponding to the pipeline sampling location as the to-be-activated sampling device.

In some embodiments, the sampling parameter may further include a sampling detection type.

The sampling detection type refers to a type of manner in which the sampling device performs sampling. In some embodiments, the sampling detection type may include sampling detection and non-sampling detection.

The sampling detection refers to a detection manner that requires extraction of gas in the pipeline for sample detection. The non-sampling detection refers to a detection manner that does not require extraction of the gas in the pipeline for direct detection.

In some embodiments, for an abnormal pipeline and the abnormal region corresponding to the abnormal pipeline, the processor may determine the sampling detection type based on the abnormal pipeline and the pipeline sensing data of the abnormal region corresponding to the abnormal pipeline. In response to determining that a plurality of sampling devices are provided for the abnormal pipeline, the processor may evaluate a sampling detection capability of each of the plurality of sampling devices based on the pipeline sensing data of the abnormal pipeline and the sampling detection type, and determine the to-be-activated sampling device based on the sampling detection capability of at least one sampling device of the plurality of sampling devices.

In some embodiments, the processor may determine the sampling detection type based on the abnormal pipeline and the pipeline sensing data of the abnormal region corresponding to the abnormal pipeline in a plurality of ways. For example, the processor may determine the sampling detection type by querying a third preset relationship table.

The third preset relationship table includes a corresponding relationship between abnormal regions and anomalous data items of abnormal pipelines and corresponding sampling detection types. The third preset relationship table may be constructed based on historical data. For example, for an abnormal region and an anomalous data item of a historical abnormal pipeline in the historical data, the processor may statistically analyze one or more historical sampling detection types actually used subsequently, and determine a historical sampling detection type with a highest occurrence frequency as the historical sampling detection type corresponding to the abnormal region and the anomalous data item of the historical abnormal pipeline. The processor may traverse a plurality of historical abnormal pipelines to construct the third preset relationship table.

The sampling detection capability refers to an ability of the sampling device to obtain sampling data that accurately reflects fault issues of the pipeline. In some embodiments, the sampling detection capability may be represented by a numerical value. The larger the numerical value is, the larger the sampling detection capability is.

In some embodiments, the processor may determine the sampling detection capability of the sampling device based on the pipeline sensing data of the abnormal pipeline and the sampling detection type in a plurality of ways. For example, the processor may determine the sampling detection capability of the sampling device by vector matching.

Merely by way of example, the processor may construct a first standard vector library. The first standard vector library may include a plurality of first standard vectors and a plurality of first labels corresponding to the plurality of first standard vectors. The first standard vectors may include pipeline sensing data and sampling detection types, and the first labels may be sampling detection capabilities of sampling devices corresponding to the first standard vectors.

In some embodiments, the processor may construct first clustering vectors based on historical pipeline sensing data, historical sampling detection types, and corresponding historical sampling detection capabilities in the historical data, and cluster the first clustering vectors. The processor may construct a plurality of first standard vectors based on the historical pipeline sensing data, the historical sampling detection types, and the corresponding historical sampling detection capabilities corresponding to clustering centers formed by clustering of the first clustering vectors, and determine the historical sampling detection capabilities corresponding to the clustering centers as first labels of the first standard vectors.

In some embodiments, the processor may determine a fault similarity between a historical fault detection command corresponding to historical sampling data and historical pipeline fault information actually monitored, and determine the fault similarity as the historical sampling detection capability.

The fault similarity refers to a similarity between the historical fault detection command and the historical pipeline fault information actually monitored. The fault similarity may be represented by a cosine similarity, a Euclidean distance, etc.

In some embodiments, the processor may construct a first to-be-matched vector based on the pipeline sensing data and the sampling detection type of a current abnormal pipeline, match the first to-be-matched vector with the plurality of first standard vectors in the first standard vector library, and determine a plurality of vector similarities between the first to-be-matched vector and the plurality of first standard vectors. The processor may determine the first label corresponding to a first standard vector with a highest vector similarity as the sampling detection capability of the current sampling device. The vector similarity may be represented by a cosine similarity, a Euclidean distance, etc.

In some embodiments, the processor may determine the sampling detection capability of the sampling device using a detection capability assessment model based on the pipeline sensing data of the abnormal pipeline and the sampling detection type. More details regarding this section may be found in the other contents of the present disclosure (e.g., description in connection with FIG. 4).

In some embodiments, the processor may determine the to-be-activated sampling device based on the sampling detection capability in a plurality of ways. For example, the processor may select one or more sampling devices with a highest sampling detection capability as the to-be-activated sampling device.

In some embodiments of the present disclosure, determining a suitable sampling detection type for abnormal pipeline sensing data can improve the efficiency of sampling. By evaluating the sampling detection capability of at least one sampling device, the sampling device with a relatively good sampling effect can be effectively selected, which is conducive to reducing resource consumption in the sampling process, and reducing an impact of the sampling device on the pipeline.

In some embodiments of the present disclosure, by determining at least one abnormal pipeline and at least one abnormal region corresponding to the at least one abnormal pipeline based on the pipeline sensing data, and then determining the sampling parameter, sampling can be performed in a more targeted manner, further reducing the count of to-be-activated sampling devices, thereby reducing resource consumption.

Figure 4:
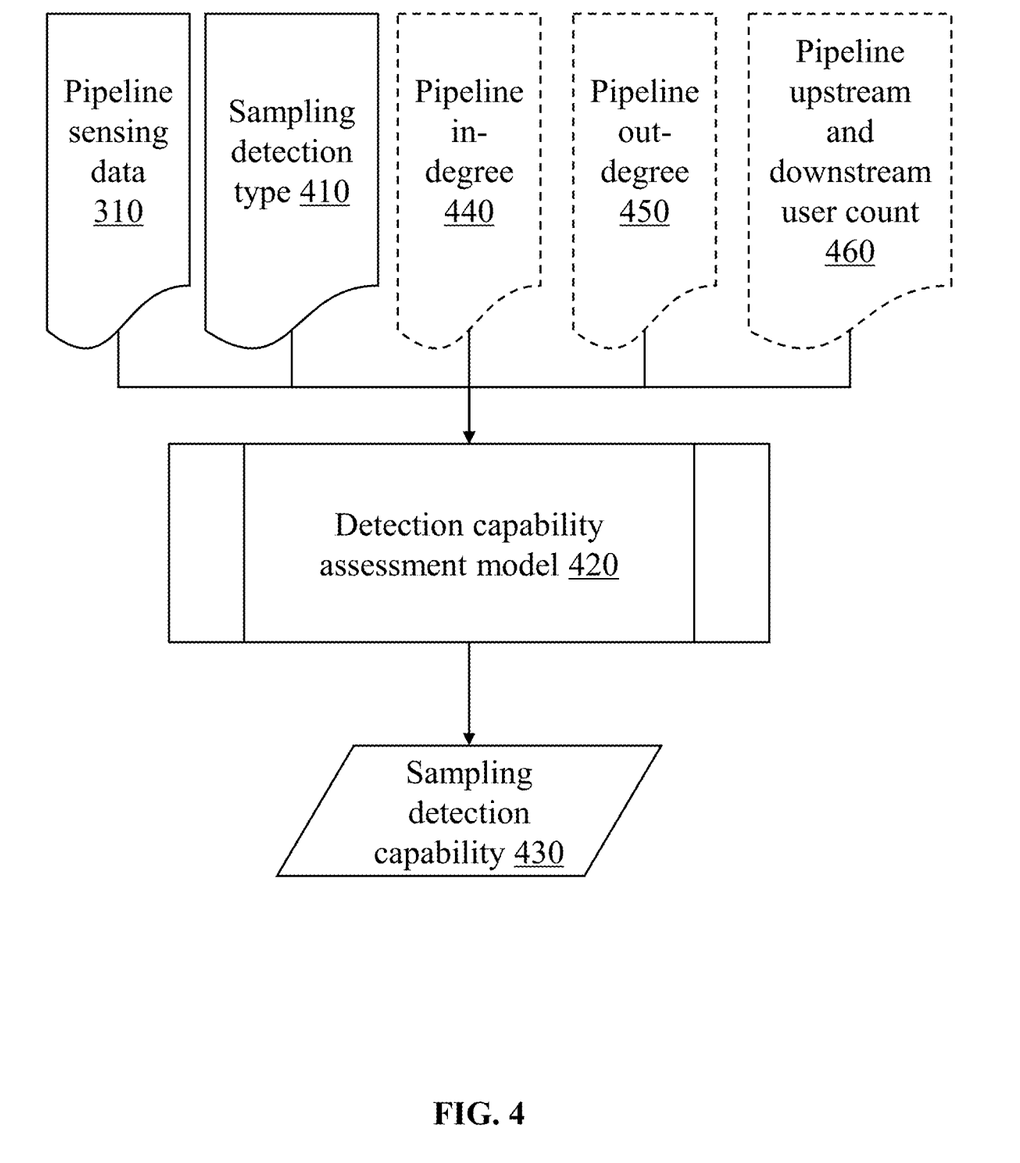
FIG. 4 is a schematic diagram illustrating an exemplary detection capability assessment model according to some embodiments of the present disclosure.

FIG. 4 is a schematic diagram illustrating an exemplary detection capability assessment model according to some embodiments of the present disclosure.

In some embodiments, as shown in FIG. 4, a processor may determine, based on pipeline sensing data 310 of an abnormal pipeline and a sampling detection type 410, a sampling detection capability 430 of a sampling device through a detection capability assessment model 420.

More details regarding the abnormal pipeline, the pipeline sensing data, the sampling detection type, the sampling detection capability, and the sampling device may be found in other contents of the present disclosure (e.g., descriptions in connection with FIGS. 1-3).

The detection capability assessment model refers to a model configured to determine the sampling detection capability. In some embodiments, the detection capability assessment model may be a machine learning model, e.g., a neural network (NN), etc.

In some embodiments, as shown in FIG. 4, an input to the detection capability assessment model 420 may include the pipeline sensing data 310 of the abnormal pipeline and the sampling detection type 410, and an output of the detection capability assessment model 420 may be the sampling detection capability 430 of the sampling device.

In some embodiments, the detection capability assessment model may be obtained by training in a plurality of ways. For example, the detection capability assessment model may be obtained by training a plurality of first training samples with first training labels, etc. A set of first training samples for training may include sample pipeline sensing data of a sample abnormal pipeline and a sample sampling detection type. The first training label corresponding to the set of first training samples is an actual sampling detection capability of the sample sampling device.

In some embodiments, the processor may select historical pipeline sensing data of a historical abnormal pipeline and a historical sampling detection type as a set of first training samples, and use a historical sampling detection capability of a historical sampling device corresponding to the set of first training samples as the first training label of the set of first training samples. The manner for obtaining the first training labels is similar to the manner for obtaining the first labels of the first standard vector library in FIG. 3, and more descriptions may be found in the relevant descriptions thereof.

In some embodiments, the processor may input the sample pipeline sensing data of the sample abnormal pipeline and the sample sampling detection type into an initial detection capability assessment model, construct a first loss function based on a sampling detection capability of the sampling device outputted from the initial detection capability assessment model and the first training label, and update parameters of the initial detection capability assessment model based on the first loss function. When a first preset condition is satisfied, the training of the initial detection capability assessment model is completed, and a trained detection capability assessment model is obtained. The first preset condition may include that the first loss function converges, a count of iterations reaches a threshold, or the like.

In some embodiments, as shown in FIG. 4, the input to the detection capability assessment model 420 further includes a pipeline in-degree 440, a pipeline out-degree 450, and a pipeline upstream and downstream user count 460.

More descriptions of the pipeline in-degree may be found in other contents of the present disclosure (e.g., description in connection with FIG. 2).

The pipeline out-degree of a current pipeline refers to a count of other pipelines into which gas converges after flowing out of the current pipeline.

The pipeline upstream and downstream user count refers to a count of upstream users and downstream users connected to the pipeline. The users refer to gas users. In some embodiments, the pipeline upstream and downstream user count may include a count of the upstream pipeline users and a count of the downstream pipeline users.

In some embodiments of the present disclosure, by using the pipeline in-degree, the pipeline out-degree, and the pipeline upstream and downstream user count as the input to the detection capability assessment model, an impact of a surrounding pipeline environment of the pipeline on the measurements can be effectively taken into account, making the determination of the sampling detection capability more accurate.

In some embodiments, the detection capability assessment model may include a first stage of training. The first stage of training may include training based on a first training set, validation based on a first validation set, and testing based on a first test set. The first training set, the first validation set, and the first test set are datasets including historical pipeline sensing data, historical sampling detection types, historical upstream and downstream pipeline counts, and historical pipeline upstream and downstream user count. A data volume of the first training set, a data volume of the first validation set, and a data volume of the first test set form a first preset ratio, and there is no data overlap among the first training set, the first validation set, and the first test set. A sample statistical difference of the first training set is greater than a preset difference threshold, the preset difference threshold being related to an incident frequency of historical sampling incidents.

The first training set refers to a dataset used to train internal parameters of the detection capability assessment model.

The first validation set refers to a dataset used to validate a state of the detection capability assessment model and the convergence the first loss function during the training process.

The first test set refers to a dataset used to test a generalization ability of the detection capability assessment model.

In some embodiments, a piece of historical pipeline sensing data, a historical sampling detection type corresponding to the historical pipeline sensing data, a historical upstream and downstream pipeline count, and a historical pipeline upstream and downstream user count form a data group. Each of the first training set, the first validation set, and the first test set is composed of a plurality of data groups.

The first preset ratio may be set by system default or by a technician based on experience. For example, the first preset ratio may be 8:1:1.

The data overlap refers to the presence of a same piece of data in different sets, i.e., the same piece of data is used in a plurality of datasets. In some embodiments, there is no data overlap in the first training set, the first validation set, and the first test set.

The sample statistical difference refers to an overall variance in sample data. In some embodiments, the processor may numerically quantify each sample data in the first training set, determine a vector distance between each pair of sample data in the first training set, and determine a variance of a plurality of vector distances. The processor may determine the sample statistical difference based on the variance.

The numerical quantification refers to mapping a data group to a numerical vector. For example, in the historical sampling detection type, sampling detection may be assigned a value of 1 and non-sampling detection may be assigned a value of 0. Other sample data in the data group are numerical and may be used directly. The vector distance between each pair of sample data may be represented by a cosine distance between the each pair of digital vectors. The greater the variance of the plurality of vector distances is, the greater the sample statistical difference is.

A sampling incident refers to an incident caused by sampling. For example, the sampling incident includes poor quality of sampling data, a quality problem in the pipeline due to sampling, etc. In some embodiments, the incident frequency of historical sampling incidents refers to a frequency of historical sampling accidents in a large number of historical samplings. The greater the incident frequency of the historical sampling incidents is, the greater the preset difference threshold may be.

In some embodiments of the present disclosure, by performing the first stage of training on the model based on the first training set, the first validation set, and the first test set, and determining the preset difference threshold corresponding to the sample statistical difference of the first training set threshold based on the incident frequency of the historical sampling incidents, broader and more comprehensive sample data can be selected for model training. Introducing the sample statistical difference can make the model more robust, prevent overfitting of the model, and facilitate the model to learn more accurately to predict the sampling detection capability.

In some embodiments of the present disclosure, through the machine learning model, the sampling detection capability of the sampling device can be automated and accurately determined.

Figure 5:
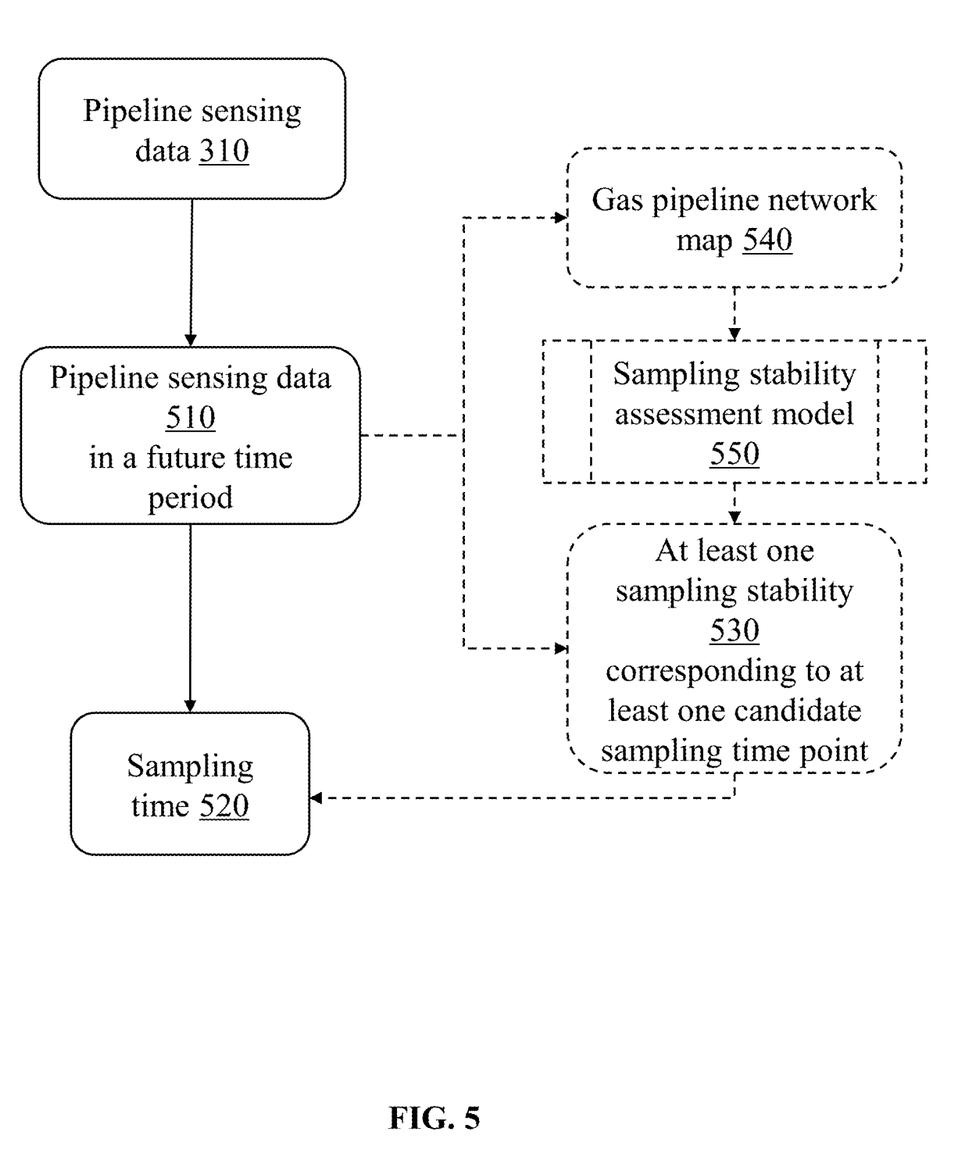
FIG. 5 is a schematic diagram illustrating the determination of a sampling time according to some embodiments of the present disclosure.

FIG. 5 is a schematic diagram illustrating the determination of a sampling time according to some embodiments of the present disclosure.

In some embodiments, a sampling parameter of a sampling device may include the sampling time. More descriptions of the sampling parameter may be found in FIG. 2 and the related descriptions thereof.

The sampling time refers to a time point when the sampling device starts sampling. The sampling time is a future time point relative to a current time point.

In some embodiments, as shown in FIG. 5, the processor may determine pipeline sensing data 510 of at least one pipeline in a future time period based on the pipeline sensing data 310 for the at least one pipeline, and determine the sampling time 520 based on the pipeline sensing data 510 of the at least one pipeline in the future time period.

The future time period refers to a period of time after the current time point.

In some embodiments, the processor may determine, based on the pipeline sensing data of the at least one pipeline, the pipeline sensing data of the at least one pipeline in the future time period in a plurality of ways.

For example, the processor may determine a plurality of first similarities between the pipeline sensing data at the current time point and historical pipeline sensing data at a plurality of historical time points in historical data, determine a historical time point corresponding to historical pipeline sensing data with a highest first similarity, and designate the historical pipeline sensing data in a subsequent time period of the historical time point as the pipeline sensing data in the future time period of the current time point. The subsequent time period of the historical time point has a same duration as the future time period of the current time point. The first similarity may be represented by a vector distance.

In some embodiments, the processor may determine the sampling time based on the pipeline sensing data of the at least one pipeline in the future time period in a plurality of ways. For example, the processor may select a plurality of future time points within the future time period. For each future time point, the processor may determine a gradient between the pipeline sensing data of each of the at least one pipeline and the pipeline sensing data of a neighboring pipeline at the future time point, and determine a mean gradient corresponding to all pipelines in a gas pipeline network at the future time point. In this manner, the processor determines a plurality of mean gradients corresponding to the plurality of future time points, wherein each of the plurality of mean gradients corresponding to the one future time point. The processor determines, among the plurality of mean gradient values corresponding to the plurality of future time points, a future time point with a smallest mean gradient as the sampling time.

The manner for selecting the plurality of future time points within the future time period is similar to the manner for determining a candidate sampling time point, which may be found in related descriptions below.

In some embodiments, the processor may determine at least one candidate sampling time point, determine at least one sampling stability corresponding to the at least one candidate sampling time point based on the pipeline sensing data of the at least one pipeline in the future time period, and determine the sampling time based on the at least one sampling stability corresponding to the at least one candidate sampling time point.

In some embodiments, the processor may determine the at least one candidate sampling time point in a plurality of ways. For example, the processor may divide the future time period by a preset length to obtain a plurality of sub-periods, and designate a start time point or an end time point of each of the sub-periods as a candidate sampling time point. The preset length is negatively correlated with a count of the at least one candidate sampling time point, with the larger the preset length, the smaller the count of the at least one candidate sampling time point. A count of the at least one candidate sampling time point may be system default or set by a technician according to actual requirements.

The sampling stability corresponding to a candidate sampling time point refers to a stability of the gas pipeline network at the candidate sampling time point. In some embodiments, the sampling stability may be affected by a sampling behavior or the gas pipeline network. For example, if a plurality of large chemical enterprises start using gas at a time point, gas fluctuations in the gas pipeline network may be significant, thus the gas pipeline network has a potentially poor sampling stability at the time point. As another example, an improper operation during sampling by the sampling device may cause a large amount of gas to leak, leading to instability in the gas pipeline network.

In some embodiments, the processor may determine the at least one sampling stability corresponding to the at least one candidate sampling time point in a plurality of ways based on the pipeline sensing data of the at least one pipeline in the future time period. For example, the processor may determine the at least one sampling stability corresponding to the at least one candidate sampling time point by vector matching.

Merely by way of example, the processor may construct a second standard vector library. The second standard vector library may include a plurality of second standard vectors and a plurality of second labels corresponding to the plurality of second standard vectors. The second standard vectors may include pipeline sensing data and sampling times, and the second labels may be sampling stabilities corresponding to the sampling times.

In some embodiments, the processor may construct a plurality of second clustering vectors based on historical pipeline sensing data, historical sampling times, and corresponding historical sampling stabilities in historical data, cluster the plurality of second clustering vectors, and construct second standard vectors based on the historical pipeline sensing data and the historical sampling times corresponding to clustering centers formed by clustering. The processor may designate the historical sampling stabilities corresponding to the clustering centers as the second labels for the second standard vectors.

In some embodiments, the processor may determine a second similarity between pipeline sensing data before the historical sampling time and pipeline sensing data after the historical sampling time, and determine the historical sampling stability based on the second similarity. The processor may determine the historical sampling stability based on the second similarity in a plurality of ways. For example, the processor may use 1 minus the second similarity as the historical sampling stability. The second similarity may be represented by a cosine similarity, a Euclidean distance, etc.

In some embodiments, the processor may construct a second to-be-matched vector based on the pipeline sensing data in the future time period of the current time point and the candidate sampling time point, match the second to-be-matched vector with the second standard vectors in the second standard vector library, and determine a plurality of vector similarities between the second to-be-matched vector and the plurality of second standard vectors. The processor may determine the second label corresponding to a second standard vector with a highest vector similarity as the sampling stability of the candidate sampling time point. The vector similarities may be expressed by a cosine similarity, a Euclidean distance, or the like.

In some embodiments, as shown in FIG. 5, the processor may construct a gas pipeline network map 540, and determine at least one sampling stability 530 corresponding to the at least one candidate sampling time point through a sampling stability assessment model 550 based on the gas pipeline network map 540.

The gas pipeline network map refers to a map that reflects a connection relationship between pipelines and devices in the gas pipeline network. In some embodiments, the gas pipeline network map includes nodes and edges.

In some embodiments, the nodes of the gas pipeline network map may include a gas pipeline node, a gas supply device node, and a gas consuming device node.

The gas pipeline node refers to a node representing a gas pipeline. The gas supply device node refers to a node representing a gas supply device. The gas consuming device node refers to a node representing a gas consuming device. The gas supply device refers to a device that provides gas, such as a gas mixer, a gas regulator box, or the like. The gas consuming device refers to a terminal device that uses gas, such as a residential gas appliance, or the like.

In some embodiments, a node attribute of the gas pipeline node may include current pipeline sensing data of the pipeline and the pipeline sensing data in the future time period. A node attribute of the gas supply device node may include gas supply arrangement. A node attribute of the gas consuming device node may include gas consuming device information and a current gas consuming rate.

The gas supply arrangement refers to output parameters of gas at each time point. For example, the gas supply arrangement includes an output flow rate, an output volume, an output air pressure, an output gas concentration, an output gas composition, or the like. In some embodiments, the processor may obtain the gas supply arrangement from a gas company management platform. The gas consuming device information refers to information related to the gas consuming device, e.g., a type of the gas consuming device, or the like. The current gas consuming rate refers to a rate at which gas is currently being used, e.g., 5 m/s, etc.

In some embodiments, the node attribute of the gas pipeline node of the gas pipeline network map may further include a pipeline in-degree of the gas pipeline node.

In some embodiments of the present disclosure, the node attribute of the gas pipeline node takes into account the pipeline in-degree. The pipeline in-degree can characterize a complexity level of the gas pipeline network and improve the accuracy of the subsequent determination of the sampling stability.

In some embodiments, the edges of the gas pipeline network map may be connecting edges between the nodes where gas flows mutually. An edge attribute of the edges of the gas pipeline network map may include a gas flow direction and a gas flow rate. The gas flow direction refers to a direction from the node where the gas flows out to the node where the gas flows in.

The sampling stability assessment model refers to a model configured to determine the at least one sampling stability corresponding to the at least one candidate sampling time point. In some embodiments, the sampling stability assessment model may be a machine learning model, e.g., a Graph Neural Networks (GNN) model, etc.

In some embodiments, an input to the sampling stability assessment model may include the gas pipeline network map and a candidate sampling time point, and an output may be the sampling stability corresponding to the candidate sampling time point.

In some embodiments, the processor may train the sampling stability assessment model based on a plurality of second training samples with second training labels. The training process for the sampling stability assessment model is similar to the training process for the detection capability assessment model, which may be found in FIG. 4 and the related descriptions thereof. A set of second training samples may include a sample gas pipeline network map and a sample candidate sampling time point, and the second training label corresponding to the set of second training samples may be a sampling stability of the sample candidate sampling time point corresponding to the second training samples.

In some embodiments, the processor may select a historical gas pipeline network map and a historical sampling time as a set of second training samples, and designate the historical sampling stability of the historical sampling time corresponding to the set of second training samples as the second training label. The manner for obtaining the second training label for the set of second training samples is similar to the manner for obtaining the second label for the second standard vector, and more descriptions may be found in the related descriptions thereof.

In some embodiments of the present disclosure, the at least one sampling stability corresponding to the at least one candidate sampling time point can be accurately determined through the sampling stability assessment model, thereby determining a suitable sampling time for sampling the gas pipeline and improving work efficiency.

In some embodiments, the processor may determine the sampling time based on the at least one sampling stability corresponding to the at least one candidate sampling time point in a plurality of ways. For example, the processor may rank the sampling stabilities of a plurality of candidate sampling time points, and select one or more candidate sampling time points with a highest sampling stability as the sampling time.

In some embodiments of the present disclosure, by evaluating the at least one sampling stability corresponding to at least one candidate sampling time point, the impact of different sampling times on the gas pipeline network can be more precisely assessed, helping to further reduce risks and economic losses associated with sampling.

In some embodiments of the present disclosure, determining the pipeline sensing data in the future time period based on the current pipeline sensing data, and then determining the sampling time, the determined sampling time can be more reasonable, thereby reducing the impact of sampling on the gas pipeline network and further reducing the risks and economic losses associated with sampling.

One or more embodiments of the present disclosure provide a non-transitory computer-readable storage medium storing computer instructions. When reading the computer instructions in the storage medium, a computer executes the method for sampling and monitoring a smart gas pipeline described in the embodiments of the present disclosure.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

In some embodiments, counts describing the quantity of components and attributes are used. It should be understood that such counts used in the description of the embodiments use the modifiers "about," "approximately," or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An Internet of Things (IoT) system for sampling and monitoring a smart gas pipeline, the IoT system comprising a government safety monitoring and management platform, a government safety monitoring sensing network platform, a government safety monitoring object platform, a gas company sensing network platform, a gas equipment object platform, and a gas maintenance object platform; wherein
   the gas equipment object platform includes at least one sampling device and at least one pipeline monitoring device;
   the gas maintenance object platform includes at least one staff interaction device;
   the government safety monitoring object platform includes a gas company management platform and a key gas-using enterprise;
   the government safety monitoring and management platform is configured to:
   obtain, via the gas company sensing network platform, the gas company management platform, and the government safety monitoring sensing network platform in sequence, pipeline sensing data of at least one pipeline collected and uploaded by the gas equipment object platform,
   determine a sampling parameter based on the pipeline sensing data of the at least one pipeline, and issue the sampling parameter, through the government safety monitoring object platform, to the at least one sampling device, wherein the sampling parameter includes at least one to-be-activated sampling device, and a pipeline sampling location and a sampling time corresponding to each of the at least one to-be-activated sampling device, and the government safety monitoring and management platform is configured to:
   determine, based on the pipeline sensing data of the at least one pipeline, pipeline sensing data of the at least one pipeline in a future time period;
   determine a candidate sampling time point;
   determine a sampling stability corresponding to the candidate sampling time point based on the pipeline sensing data of the at least one pipeline in the future time period;
   determine the sampling time based on the sampling stability corresponding to the candidate sampling time point; and
   in response to obtaining at least one piece of sampling data from the at least one sampling device, determine a fault detection command based on the at least one piece of sampling data, and send the fault detection command to the gas maintenance object platform, so that the gas maintenance object platform schedules a manual inspection.

2. The IoT system of claim 1, wherein the government safety monitoring and management platform is further configured to:
   determine at least one abnormal pipeline and at least one abnormal region corresponding to the at least one abnormal pipeline based on the pipeline sensing data of the at least one pipeline; and
   determine the at least one to-be-activated sampling device and the pipeline sampling location corresponding to each of the at least one to-be-activated sampling device based on the at least one abnormal pipeline and the at least one abnormal region corresponding to the at least one abnormal pipeline.

3. The lol system of claim 2, wherein the sampling parameter further includes a sampling detection type, the sampling detection type includes sampling detection and non-sampling detection;
   the government safety monitoring and management platform is further configured to:
   for an abnormal pipeline of the at least one abnormal pipeline and an abnormal region corresponding to the abnormal pipeline,
   determine the sampling detection type based on the abnormal pipeline and pipeline sensing data of the abnormal region corresponding to the abnormal pipeline;
   in response to determining that a plurality of sampling devices are provided for the abnormal pipeline, determine a sampling detection capability of each of the plurality of sampling devices based on the pipeline sensing data of the abnormal pipeline and the sampling detection type; and
   determining the at least one to-be-activated sampling device based on the sampling detection capability of the at least one sampling device of the plurality of sampling devices.

4. A method for sampling and monitoring a smart gas pipeline performed based on an Internet of Things (IoT) system for sampling and monitoring the smart gas pipeline, the IoT system comprising a government safety monitoring and management platform, a government safety monitoring sensing network platform, a government safety monitoring object platform, a gas company sensing network platform, a gas equipment object platform, and a gas maintenance object platform; the method being executed by the government safety monitoring and management platform, and the method comprising:
   obtaining, via the gas company sensing network platform, a gas company management platform, and the government safety monitoring sensing network platform in sequence, pipeline sensing data of at least one pipeline collected and uploaded by the gas equipment object platform;
   determining a sampling parameter based on the pipeline sensing data of the at least one pipeline, issuing the sampling parameter to the government safety monitoring object platform, and further issuing the sampling parameter, through the government safety monitoring object platform, to at least one sampling device, wherein the sampling parameter includes at least one to-be-activated sampling device and a pipeline sampling location corresponding to each of the at least one to-be-activated sampling device; and in response to obtaining at least one piece of sampling data from the at least one sampling device, determining a fault detection command based on the at least one piece of sampling data, and sending the fault detection command to the gas maintenance object platform, so that the gas maintenance object platform schedules a manual inspection;

wherein the sampling parameter further includes a sampling time, and determining the sampling parameter based on the pipeline sensing data of the at least one pipeline includes:

determining, based on the pipeline sensing data of the at least one pipeline, pipeline sensing data of the at least one pipeline in a future time period;

determining a candidate sampling time point;

determining a sampling stability corresponding to the candidate sampling time point based on the pipeline sensing data of the at least one pipeline in the future time period; and determining the sampling time based on the sampling stability corresponding to the candidate sampling time point.

5. The method of claim 4, wherein determining the sampling parameter based on the pipeline sensing data of the at least one pipeline includes:

determining at least one abnormal pipeline and at least one abnormal region corresponding to the at least one abnormal pipeline based on the pipeline sensing data of the at least one pipeline; and determining the at least one to-be-activated sampling device and the pipeline sampling location corresponding to each of the at least one to-be-activated sampling device based on the at least one abnormal pipeline and the at least one abnormal region corresponding to the at least one abnormal pipeline.

6. The method of claim 5, wherein the sampling parameter further includes a sampling detection type, the sampling detection type includes sampling detection and non-sampling detection;

determining the at least one to-be-activated sampling device and the pipeline sampling location corresponding to each of the at least one to-be-activated sampling device based on the at least one abnormal pipeline and the at least one abnormal region corresponding to the at least one abnormal pipeline includes:

for an abnormal pipeline of the at least one abnormal pipeline and an abnormal region corresponding to the abnormal pipeline, determining the sampling detection type based on the abnormal pipeline and pipeline sensing data of the abnormal region corresponding to the abnormal pipeline;

in response to determining that a plurality of sampling devices are provided for the abnormal pipeline, determining a sampling detection capability of each of the plurality of sampling devices based on the pipeline sensing data of the abnormal pipeline and the sampling detection type; and determining the at least one to-be-activated sampling device based on the sampling detection capability of the at least one sampling device of the plurality of sampling devices.

7. A non-transitory computer-readable storage medium storing computer instructions, wherein when reading the computer instructions in the non-transitory computer-readable storage medium, a computer executes a method for sampling and monitoring a smart gas pipeline performed based on an Internet of Things (IoT) system for sampling and monitoring the smart gas pipeline, wherein the IoT system comprises a government safety monitoring and management platform, a government safety monitoring sensing network platform, a government safety monitoring object platform, a gas company sensing network platform, a gas equipment object platform, and a gas maintenance object platform; the method is executed by the government safety monitoring and management platform, and the method comprises:

obtaining, via the gas company sensing network platform, a gas company management platform, and the government safety monitoring sensing network platform in sequence, pipeline sensing data of at least one pipeline collected and uploaded by the gas equipment object platform;

determining a sampling parameter based on the pipeline sensing data of the at least one pipeline, issuing the sampling parameter to the government safety monitoring object platform, and further issuing the sampling parameter, through the government safety monitoring object platform, to at least one sampling device, wherein the sampling parameter includes at least one to-be-activated sampling device and a pipeline sampling location corresponding to each of the at least one to-be-activated sampling device; and in response to obtaining at least one piece of sampling data from the at least one sampling device, determining a fault detection command based on the at least one piece of sampling data, and sending the fault detection command to the gas maintenance object platform, so that the gas maintenance object platform schedules a manual inspection;

wherein the sampling parameter further includes a sampling time, and determining the sampling parameter based on the pipeline sensing data of the at least one pipeline includes:

determining, based on the pipeline sensing data of the at least one pipeline, pipeline sensing data of the at least one pipeline in a future time period;

determining a candidate sampling time point;

determining a sampling stability corresponding to the candidate sampling time point based on the pipeline sensing data of the at least one pipeline in the future time period; and determining the sampling time based on the sampling stability corresponding to the candidate sampling time point.

* * * * *